(12) United States Patent
Abe et al.

(10) Patent No.: US 6,384,970 B1
(45) Date of Patent: May 7, 2002

(54) LENTICULAR LENS SHEET AND METHOD FOR PRODUCING IT

(75) Inventors: Yoshio Abe; Osamu Shinji, both of Nakajho-machi (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/359,657

(22) Filed: Jul. 26, 1999

(30) Foreign Application Priority Data

Aug. 5, 1998 (JP) ............................................. 10-221477
Sep. 3, 1998 (JP) ............................................. 10-248979

(51) Int. Cl.$^7$ ............................ G03B 21/60; G02B 27/10
(52) U.S. Cl. ....................................... 359/455; 359/619
(58) Field of Search ................................ 359/455, 456, 359/619, 457, 460, 625, 628

(56) References Cited

U.S. PATENT DOCUMENTS 4,509,823 A * 4/1985 Moriguchi et al. ......... 359/457
5,434,706 A * 7/1995 Mitani et al. ............... 359/457
5,615,045 A * 3/1997 Takuma et al. ............. 359/456

* cited by examiner

*Primary Examiner*—Christopher E. Mahoney
(74) *Attorney, Agent, or Firm*—Oblon, Spivak, McClelland, Maier & Neustadt, P.C.

(57) ABSTRACT

Provided is a lenticular lens sheet on which external light reflection is greatly reduced and which gives high-contrast sharp images. The lenticular lens sheet has a plurality of lenticular lenses formed on one surface of a light-transmissive substrate and having, on the other surface of the substrate, convex lenses 2, and external light-absorbing ridges 3 as formed alternately with those convex lenses and coated with an external light-absorbing layer 4 on their tops, in which every furrow 5 between each convex lens 2 and each external light-absorbing ridge 3 that ate adjacent to each other is further coated with an external light-absorbing layer 6. The external light-absorbing layer may be not only on the top of each ridge but also around each ridge adjacent to the top thereof.

15 Claims, 5 Drawing Sheets

LENTICULAR LENS SHEET AND METHOD FOR PRODUCING IT

BACKGROUND OF THE INVENTION

1. Field of the Invention

The present invention relates to a lenticular lens sheet for light-transmissive screens to be used in rear projection televisions, etc., and to a method for product it.

2. Description of the Related Art

A light transmissive screen to be used in rear projection televisions and others generally has a constitution of two lens sheets combined. Specifically, it comprises a Fresnel lens sheet and a lenticular lens sheet as so aligned that the former is to be on the side of a light source while the latter to be on the side of a viewer, in which the Fresnel lens sheet has the function of focusing rays of image light from CRT or those having passed through a liquid-crystal system thereby to make them fall within a range of predetermined angles and the lenticular lens sheet has the function of again diffusing the rays of image light having passed through the Fresnel lens sheet thereby to make them fall within a range of suitably broadened angles.

Figure 12:
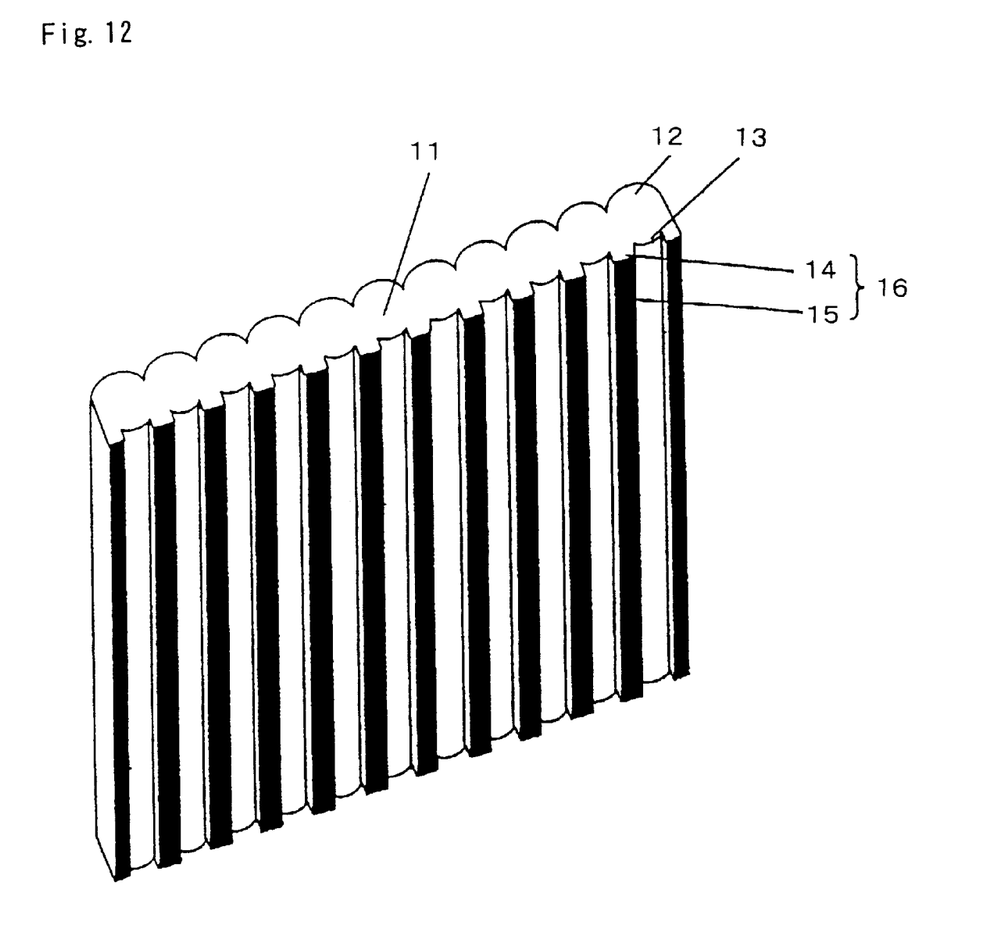
FIG. 12 is a fragmentary perspective view showing a conventional lenticular lens sheet.

FIG. 12 shows a fragmentary perspective view of a conventional lenticular lens sheet. As in FIG. 12, the lenticular lens sheet 11 has lenticular lenses 12 formed on its one surface that receives rays of image light incident thereon. The other surface of the lenticular lens sheet 11 through which the rays of image light having entered the sheet 11 go out is generally so formed that it has thereon a light-condensing region 13 that collects the rays of image light from the lenticular lenses 12. The light-condensing region 13 is lenticulated, as illustrated, so as to improve its capabilities to diffuse the rays of image light having entered the lenticular lens sheet 11 in the horizontal direction of the sheet 11. Especially in lenticular lens sheets of that type to be combined with three-tube CRT projectors, the light-condensing region 13 must be indispensably lenticulated so that it could have the ability to correct the color shift of three colors. In the lenticular lens sheet 11 illustrated, the non-light-condensing region 14 (except the light-condensing region 13) in which the rays of image light from the lenticular lenses 12 formed on the surface of the sheet 11 that receives the rays of image light are not condensed shall be ridged in plural ridges each having a top parallel to the sheet 11. Each top of the ridges and the sides of each ridge adjacent to its top (the upper sides thereof) are all coated with an external light-absorbing layer 15 of a black pigment or the like through roll coating, screen printing, transfer printing or the like. In that manner, the non-light-condensing region 14 shall be in the form of external light-absorbing ridges 16. With the ridges 16, the lenticular lens sheet 11 reduces a part of the external light having entered it and going out through its light exit surface toward a viewer, thereby increasing the contrast of the image which the viewer receives via the sheet 11.

However, merely coating the top and the upper sides of each external light-absorbing ridge of the lenticular lens sheet with such an external light-absorbing layer is not satisfactory for obtaining high image contrasts in surroundings where external light exists. In that condition, one subject matter of the lenticular lens sheet is to much more reduce the external light reflection on the sheet.

A method has been proposed, which comprises coating not only the top and the upper sides of each external light-absorbing ridge of a lenticular lens sheet but also the entire sides thereof with an external light-absorbing layer (see JP-A 59-87042U). According to that method, the external light-absorbing area of the lenticular lens sheet is broadened and the proportion of external light to be absorbed by the sheet is thereby increased. In ordinary lenticular lens sheets, however, the top of each lenticule constituting the light-condensing region is naturally higher than the bottom edges of each ridge constituting the external light-absorbing region. In those, therefore, even if not only the top but also the entire sides of each ridge constituting the external light-absorbing are desired to be coated with a material of forming an external light-absorbing layer through ordinary roll coating, screen printing, transfer printing or the like, it is extremely difficult to apply the light-absorbing material only onto the entire surface of the external light-absorbing region inclusive of the bottom edges of each ridge constituting the region, but not onto the lenticular lenses that constitutes the light-condensing region. In fact, in practical processes, it is difficult to produce lenticular lens sheets where the sides of all ridges constituting the external light-absorbing region are entirely coated with a material of forming an external light-absorbing layer.

SUMMARY OF THE INVENTION

The present invention has been made in consideration of the situation as above, and its object is to provide a lenticular lens sheet capable of significantly reducing external light reflection thereon and capable of giving high-contrast sharp images therethrough, and to provide a method of producing the lenticular lens sheet in a simplified manner.

To attain the object as above, the lenticular lens sheet of the invention has a plurality of lenticular lenses formed on one surface of a light-transmissive substrate, while having, on the other surface of the substrate, a plurality of convex lenses located at or near a focal position of each lenticular lens, and external light-absorbing, ridges as formed alternately with those convex lenses and coated with an external light-absorbing layer on their tops, and is characterized in that every furrow between each convex lens and each external light-absorbing ridge that are adjacent to each other is further coated with an external light-absorbing layer. In the sheet, the external light-absorbing layer to cover each external light-absorbing ridge may be not only on the top of each ridge but also around a part of each ridge adjacent to the top thereof.

The lenticular lens sheet of the invention may be produced in a method comprising applying an external light-absorbing material to a light-transmissive substrate having a plurality of lenticular lenses formed on one surface and having, on the other surface, a plurality of convex lenses located at or near a focal position of each lenticular lens, along with external light-absorbing ridges as formed alternately with those convex lenses so as to be coated with an external light-absorbing layer on their tops, thereby filling every furrow space between each convex lens and each external light-absorbing ridge that are adjacent to each other with the external light-absorbing material as applied thereto, then removing the excess external light-absorbing material existing in the area except every furrow between each convex lens and each external light-absorbing ridge that are adjacent to each other, thereby forming a layer of the external light-absorbing material only in that every furrow, and thereafter forming an additional external light-absorbing layer on each top of every external light-absorbing ridge. In the step of the method for filling every furrow space between each convex lens and each external light-absorbing ridge that are adjacent to each other, with the external light-absorbing material, the external light-absorbing material may be applied to the entire surface of the light-transmissive substrate having the convex lenses and the external light-absorbing ridges alternately thereon. In the step of the method for forming the additional external light-absorbing layer on each top of every external light-absorbing ridge, the external light-absorbing layer may also be formed around a part of each external light-absorbing ridge adjacent to the top thereof.

The lenticular lens sheet of the invention may be produced in another method comprising applying an external light-absorbing material to a light-transmissive substrate having a plurality of lenticular lenses formed on one surface and having, on the other surface, a plurality of convex lenses located at or near a focal position of each lenticular lens, along with external light-absorbing ridges as formed alternately with those convex lenses, thereby forming a first external light-absorbing layer on each top of those external light-absorbing ridges, then (1) applying a layer of an external light-absorbing material onto the entire surface of the substrate having thereon those external light-absorbing ridges, or (2) filling every furrow space between each convex lens and each external light-absorbing ridge that are adjacent to each other with an external light-absorbing material as applied thereto, and thereafter removing the excess external light-absorbing material existing in the area except every furrow between each convex lens and each external light-absorbing ridge that are adjacent to each other, thereby forming a second external light-absorbing layer only in that every furrow. Like in that of the former method mentioned previously, also in the step of this method for forming the first external light-absorbing layer on each top of every external light-absorbing ridge, the external light-absorbing layer may also be formed around a part of each external light-absorbing ridge adjacent to the top thereof.

DETAILED DESCRIPTION OF THE INVENTION

Figure 1:
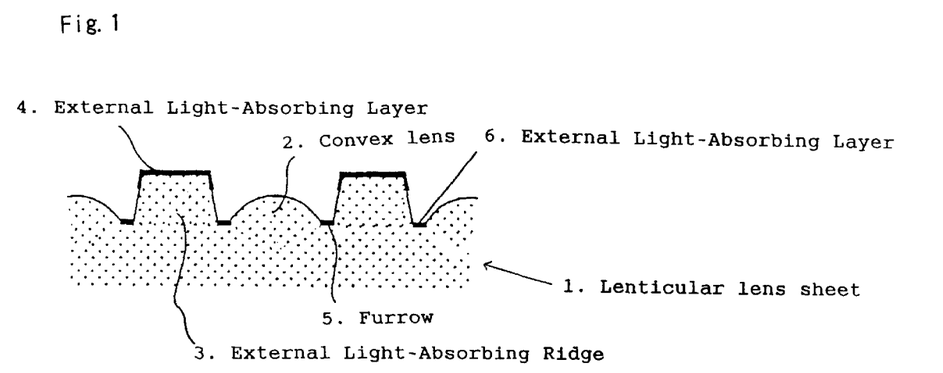
FIG. 1 is a fragmentary sectional view showing the light-projecting surface of one embodiment of the lenticular lens sheet of the invention.
Figure 2:
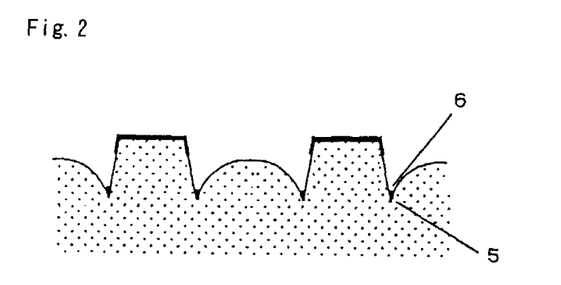
FIG. 2 is a fragmentary sectional view showing the light-projecting surface of another embodiment of the lenticular lens sheet of the invention.

A fragmentary sectional view of the light-projecting surface of one embodiment of the lenticular lens sheet of the invention is in FIG. 1. As illustrated, the lenticular lens sheet 1 has convex lenses 2 and external light-absorbing ridges 3 alternately therewith, in which each ridge 3 is coated with an external light-absorbing layer 4 on its top and around it adjacent to the top. In this, each furrow 5 between every convex lens 2 and every external light-absorbing ridge 3 is also coated with an additional external light-absorbing layer 6. The furrow 5 between the lens 2 and the ridge 3 may have a sectional profile of nearly a reversed trapezoid having a predetermined length of a bottom that is parallel to the surface of the sheet, as in FIG. 1; or its sectional profile may be of a valley with no site parallel to the surface of the sheet, as in FIG. 2.

As illustrated, the external light-absorbing layer 6 is provided on the furrow 5 between the lens 2 and the ridge 3. In that condition, external light entering the sheet is absorbed by the layer 6, whereby image contrast depression by external light is reduced in the sheet. Rays of image light do not enter the furrows 2. Therefore, the external light-absorbing layer 6 formed in those furrows does not degrade the optical properties of the lenticular lens sheet.

Figure 3:
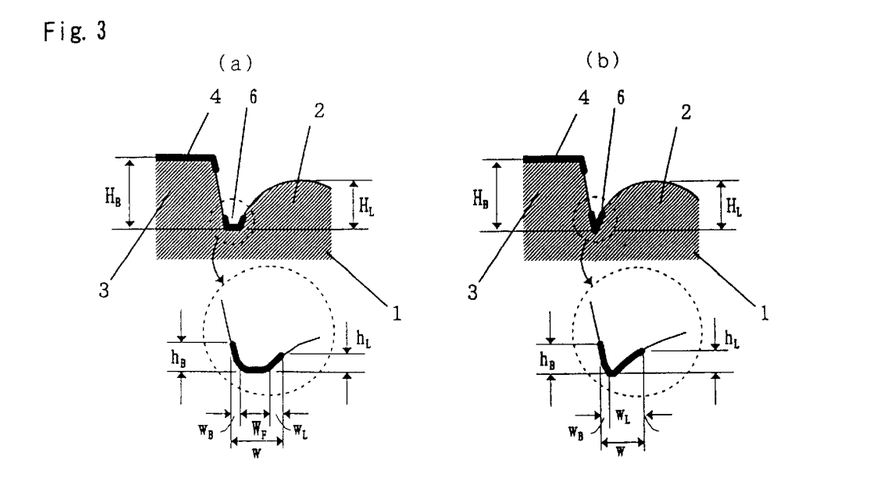
FIG. 3A and FIG. 3B are graphical views for explaining the preferred height of the external light-absorbing layer as formed in a furrow between the convex lens and the neighboring, external light-absorbing ridge.

In the embodiment of FIG. 3A, a furrow having a nearly flat bottom is formed between the neighboring lens 2 and ridge 3; while in that of FIG. 3B, a furrow not having such a nearly flat bottom is formed between them. Even when lenticular lens sheets are formed through extrusion with any of transfer rolls of FIG. 4 or FIG. 5 that will be mentioned hereinunder, the boundary between the convex lens 2 and the neighboring ridge 3 is not always distinct. Therefore, in general, the bottom of the ridge 3, that of the lens 2 and even the flat bottom of the furrow as in FIG. 3A are generally rounded, as so illustrated in the enlarged view of FIG. 3A.

In the lenticular lens sheet of the invention, it is desirable that the width of the external light-absorbing layer 6 to be formed on the furrow 5 between the lens 2 and the black ridge 3 is as large as possible without interfering with the optical properties of the lenticular lens sheet, for the purpose of ensuring high image contrasts through the sheet. One preferred height of the external light-absorbing layer 6 is described with reference to FIG. 3A and FIG. 3B. In FIG. 3A and FIG. 3B, the width of the ridge 3 (black ridge) at its bottom and that of the lens 2 also at its bottom are represented by $W_B$ and $W_L$, respectively. In FIG. 3A, the width of the flat bottom of the furrow 5 is represented by $W_F$. In those FIG. 3A and FIG. 3B, the height of the external light-absorbing layer around the bottom of the black ridge 3 from the lowermost site of the bottom thereof is represented by $h_B$, while that around the bottom of the lens 2 from the lowermost site of the bottom thereof is by $h_L$. In those, the height of the black ridge 3 from the lowermost site of the bottom thereof is represented by $H_B$, while that of the lens 2 from the lowermost site of the bottom thereof is by $H_L$.

It is desirable that $H_L$ and $h_L$ satisfy the relation of $0.02 \leq h_L/H_L \leq 0.4$. Lenticular lens sheets with $H_L$ and $h_L$ falling within that range ensure much higher image contrasts, and, in addition, they are influenced little by the external light-absorbing layer-coated bottom of each lens 2 that may repel the rays of image light passing through the sheets thereby causing light transmittance depression through the sheets and causing discoloration of images seen obliquely. More preferably, $0.03 \leq h_L/H_L \leq 0.3$. It is also desirable that $H_B$ and $h_B$ satisfy the relation of $0.01 \leq h_B/H_B \leq 0.3$. Lenticular lens sheets with $h_B/H_B$ not smaller than 0.01 ensure much higher image contrasts. The preferred uppermost limit of $h_B/H_B$ shall be determined, not depending on the optical properties of the sheets but on the process of producing the sheets in which the external light-absorbing layer must be formed on the furrows 5 while the material of the layer is prevented from adhering onto the image light-transmitting region of the lenses 2 or from remaining in the image light-transmitting region thereof. More preferably, $0.02 \leq h_B/H_B \leq 0.25$. Therefore, it is desirable that the lenticular lens sheet of the invention satisfies both the preferred range of $h_L/H_L$ and the preferred range of $h_B/H_B$.

One embodiment of the method for producing the lenticular lens sheet of the invention is described. First formed is a lenticular lens sheet substrate from a light-transmissive, thermoplastic resin through melt extrusion. Precisely, a light-transmissive, thermoplastic resin is passed through a pair of metal rolls, one being engraved with a reversed pattern of image light-receiving lenticular lenses thereon while the other being engraved with a reversed pattern of convex lenses and external light-absorbing ridges alternately to the lenses. In the latter roll, each ridge of the reversed pattern shall have a flat top to be parallel to the sheet to be formed and to be coated with an external light-absorbing layer. Having been passed through the pair of such metal rolls, the resin is shaped into a lenticular lens sheet substrate thus having the intended patterns on both surfaces.

Figure 4:
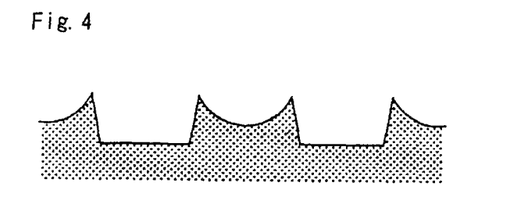
FIG. 4 is a fragmentary sectional view showing the profile of one embodiment of a roll for forming the profile of the light-projecting surface of the lenticular lens sheet of FIG. 2.
Figure 5:
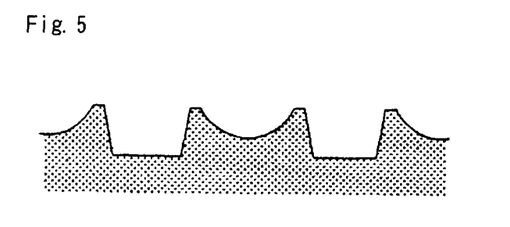
FIG. 5 is a fragmentary sectional view showing the profile of another embodiment of a roll for forming the profile of the light-projecting surface of the lenticular lens sheet of FIG. 1.

In general, the reversed pattern is engraved on the surface of each roll by lathing the copper plate layer formed on the roll. The roll to be used for forming the convex lenses and the external light-absorbing ridges on one surface of the substrate is ideally one having a reversed pattern of lenses and ridges as formed alternately and closely to each other, in which all tips of the pattern have sharp edges, as in FIG. 4. However, such a roll of FIG. 4 is often problematic in that the sharp edges of the pattern engraved thereon are broken owing to the resin pressure to be applied thereto in the process of forming the sheet substrates with it, thereby resulting in that the substrates formed could not have the predetermined pattern profile. To evade the problem of such edge breakage, the tips of the reversed pattern to be engraved on the roll may be flattened, as in FIG. 5. Using the roll with the pattern of FIG. 5, formed is a lenticular lens sheet substrate of FIG. 1, in which each furrow between the neighboring lens and ridge is formed to have a nearly flat bottom.

As in the above, the nearly flat bottom of the furrow to be between the neighboring lens and ridge in the lenticular lens sheet is owing to the limitation in the sheet production. The furrows in the lenticular lens sheet do not have any influences on the optical function of the sheet, and may well be coated with an external light-absorbing layer without interfering with the rays of image light passing through the sheet. The external light-absorbing layer may also be formed around a part of the bottom of each lens adjacent to the neighboring furrow with no problem so far as it does not have any negative influence on the rays of image light passing through the sheet. Using a roll with the pattern of FIG. 4, formed is a lenticular lens sheet substrate of FIG. 2.

Next formed is an external light-absorbing layer in every furrow between each lens and each external light-absorbing ridge on the light-transmissive lenticular lens sheet substrate. Concretely, the external light-absorbing layer in the furrows is formed by filling every furrow space between each lens and each external light-absorbing ridge on the substrate with an external light-absorbing material, followed by removing the excess external light-absorbing material existing in the site except the furrows.

As the external light-absorbing material, usable are any known ink compositions or coating compositions of solvent types, reactive two-liquid types, UV-curable types or the like, which contain a vehicle as selected in consideration of the material of the light-transmissive substrate used, and contains a light-absorbing black pigment, or silica, calcium carbonate or the like serving as a matting agent.

To fill the furrows with the external light-absorbing material, employable is any means of screen printing, curtain coating, roll coating, spraying or the like. In this step, the external light-absorbing material may fill only the furrow space between each lens and each ridge, or may be applied entirely to the light-projecting surface of the lenticular lens sheet substrate.

Figure 6:
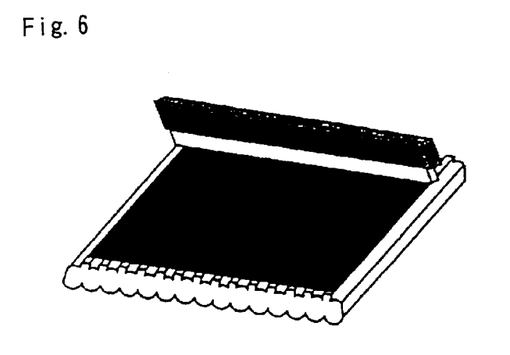
FIG. 6 is a fragmentary perspective view showing one embodiment of removing the excess external light-absorbing material from the site except the furrows formed on one surface of the lenticular lens sheet of the invention.
Figure 7:
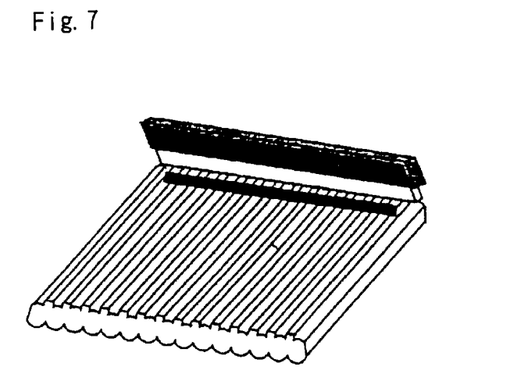
FIG. 7 is a fragmentary perspective view showing another embodiment of removing the excess external light-absorbing material from the site except the furrows formed on one surface of the lenticular lens sheet of the invention.

For removing the excess external light-absorbing material from the site except the furrows, employable is a method of scraping it away with a scraper or blade of an elastic rubber material of urethane rubber, silicone rubber or the like, a method of wiping it away with a rotating brush or the like. In order to uniformly fill the furrows on the substrate with the external light-absorbing material while completely removing the excess one from all lenses thereon, it is desirable to scrape the excess material in the direction in which the furrows run. The scraping operation may be repeated twice or more. FIG. 6 is a graphic view showing one method of scraping away the excess external light-absorbing material by the use of a rubber scraper such as a squeegee. FIG. 7 is a graphic view showing another method of applying a line of an external light-absorbing material onto one edge site of a lenticular lens sheet substrate followed by spreading it forward with a rubber scraper or the like.

After an external light-absorbing layer has been formed in all furrows on the substrate, an additional external light-absorbing layer is formed on the top of each ridge, or is formed on the top of each ridge and partly around the side of each ridge adjacent to the top thereof. Concretely, for example, the additional external light-absorbing layer may be formed by applying an ink composition or a coating composition onto the top of each ridge followed by heating it or exposing it to UV rays or the like to thereby cure the coated layer. In this method, the material for the external light-absorbing layer to be formed on the top of each ridge and that for the external light-absorbing layer to be formed in each furrow may be the same or different.

For producing the lenticular lens sheet of the invention, the order of the step of forming the external light-absorbing layer in each furrow and the step of forming it on the top of each ridge optionally around the top thereof may be reversed. For example, employable herein is another method different from the method mentioned above, which comprises forming a first external light-absorbing layer on the top of each ridge, then (1) applying a layer of an external light-absorbing material onto the entire surface of the substrate having thereon the external light-absorbing ridges, or (2) filling every furrow space between each lens and each ridge that are adjacent to each other with an external light-absorbing material as applied thereto, and thereafter removing the excess external light-absorbing material existing in the area except every furrow between each lens and each ridge that are adjacent to each other, thereby forming a second external light-absorbing layer only in that every furrow.

Figure 8:
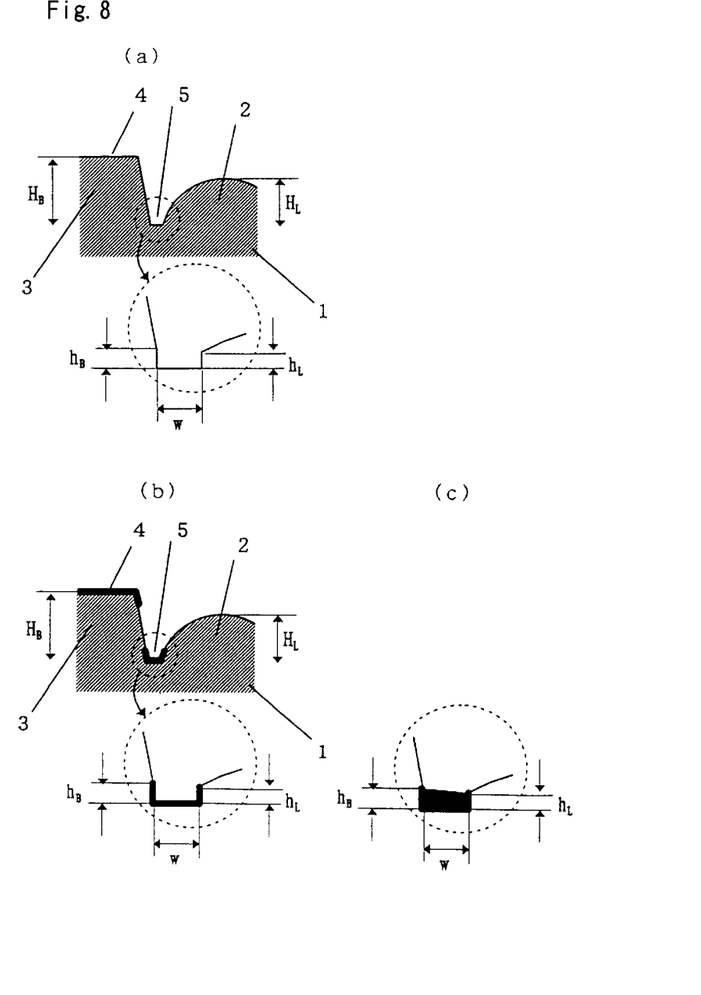
FIG. 8A to FIG. 8C are fragmentary sectional views showing one embodiment of the lenticular lens sheet of the invention having deep furrows thereon.

For efficiently producing the lenticular lens sheet of the invention according to the method noted above, it is desirable that the sectional profile of the ridge 3 discontinuously differs from that of the neighboring furrow 5 at the boundary therebetween while the sectional profile of the lens 2 also discontinuously differs from that of the neighboring furrow 5 at the boundary therebetween, and that their boundaries are distinct. FIG. 8A to FIG. 8C are fragmentary sectional views showing one embodiment of the lenticular lens sheet of the invention in which the ridge 3 extends the neighboring furrow 5 via a distinct boundary therebetween and the lens 2 extends the neighboring furrow 5 also via a distinct boundary therebetween. (In these, however, since the side of each ridge 3 is inclined only a little, the boundary between the side of the ridge 3 and the neighboring furrow 5 will be often somewhat indistinct.) The external light-absorbing layer to be formed in the furrow in this embodiment through coating or the like may run along the inner surface of the furrow, as in FIG. 8B, or may fill the furrow completely therewith, as in FIG. 8C. Regarding the depth of the furrow illustrated, it is desirable that the height, $h_L$, of the wall of the furrow coated or filled with the external light-absorbing layer and adjacent to the bottom of the lens, and the height, $H_L$, between the bottom of the furrow and the top of the lens satisfy the relation of $0.02 \leq h_L/H_L \leq 0.4$, and that $h_L$ is not smaller than 2 $\mu$m, more preferably not smaller than 3 $\mu$m.

The invention is described in more detail with reference to the following Example, which, however, is not intended to restrict the scope of the invention.

EXAMPLE

Figure 9:
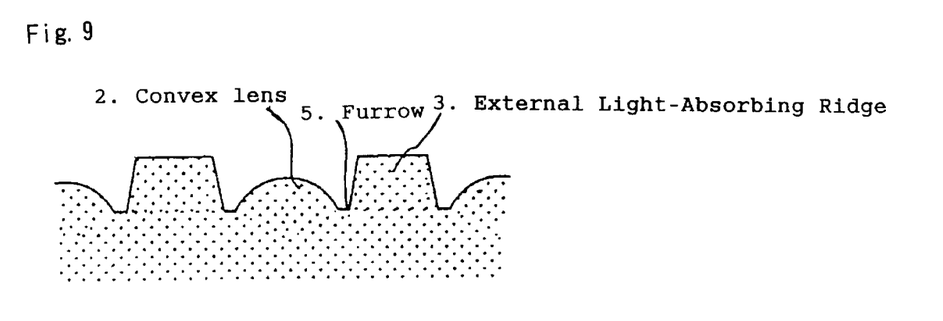
FIG. 9 is a fragmentary sectional view showing the light-projecting surface of one embodiment of the lenticular lens sheet substrate having been formed through extrusion for the invention.
Figure 10:
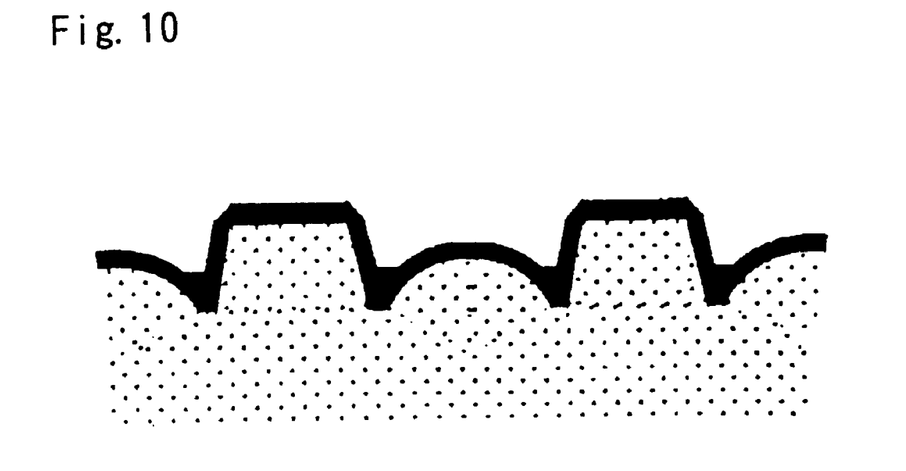
FIG. 10 is a fragmentary sectional view showing the light-projecting surface of the lenticular lens sheet substrate of FIG. 9, as entirely coated with an external light-absorbing material.
Figure 11:
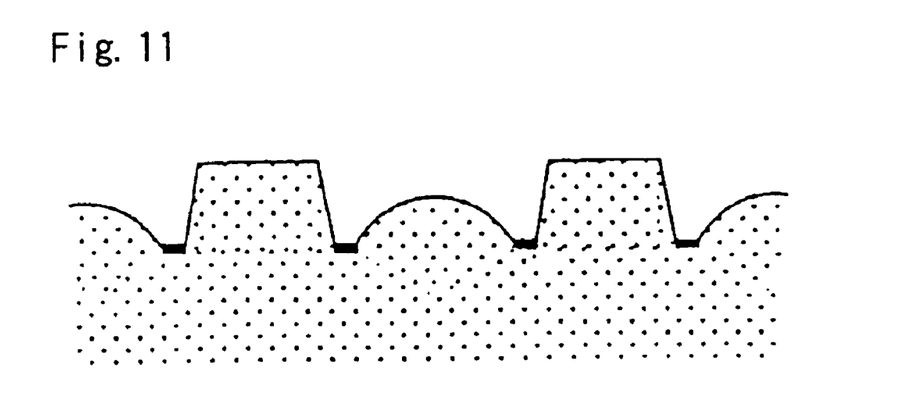
FIG. 11 is a fragmentary sectional view showing the light-projecting surface of the lenticular lens sheet substrate of FIG. 10, from which the external light-absorbing material has been removed from the site except the furrows formed thereon.

Prepared was a lenticular lens sheet substrate having a sectional profile as in FIG. 9, through extrusion of a resin. One surface of the substrate having thereon convex lenses 2, external light-absorbing ridges 3 and furrows 5 between each lens 2 and each ridge 3 was entirely coated with black ink through screen printing. FIG. 10 shows a fragmentary sectional view graphically showing the black ink-coated sheet substrate. Next, the excess ink was scraped away with a rubber squeegee that is used for screen printing. As a result, formed was an external light-absorbing layer in each furrow, as in FIG. 11. Next, the top of each ridge and partly around it adjacent to the top thereof was coated with black ink also through screen printing to thereby form an additional external light-absorbing layer on that top of each ridge and partly around it. Through the process, herein produced was a lenticular lens sheet having a sectional profile as in FIG. 1.

The lenticular lens sheet of the invention produced herein was combined with a Fresnel lens sheet. For comparison, a conventional lenticular lens sheet not having an external light-absorbing layer in each furrow was also combined with a Fresnel lens sheet. The combined lens sheets were separately settled in projection television sets, and the image contrasts in those sets were compared with each other. Both the lenticular lens sheets tested herein had the same basic structure including the lens pitch and others. The white image luminance is represented by W, the black image luminance is by B, and the external light luminance is by X. The image contrast C is represented by the following equation:

$$C = (W+X)/(B+X)$$

In this Example, the external light was derived from a fluorescence lamp in a room, and the screen illumination intensity was 250 luxes. The image luminance and the reflected external light luminance were measured in the front of the center part of the screen, at a position of 3 meters away from the screen and in the field of view of 2 degrees. The test data obtained are shown in Table 1 below. The physical data of the lenticular lens sheets tested herein are shown in Table 2 below.

TABLE 1

| | White Image Luminance (cd/m$^2$) | Black Image Luminance (cd/m$^2$) | Reflected External Light Luminance (cd/m$^2$) | Image Contrast | Difference in Image Contrast |
|---|---|---|---|---|---|
| Conventional Lenticular lens sheet | 208 | 3.2 | 3.6 | 31.1 | — |
| Lenticular lens sheet of the invention | 210 | 3.1 | 2.7 | 36.7 | 18% |

TABLE 2

| | |
|---|---|
| Lens Pitch | 0.720 mm |
| Height of Black Ridge (H$_B$) | 0.140 mm |
| Width of Flat Bottom of Furrow (W$_F$) | 0.005 mm |
| Height of Lens (H$_L$) | 0.070 mm |

As in Table 1, the image contrast through the lenticular lens sheet of the invention is higher by 18% than that through the conventional lenticular lens sheet. In visual observation, the difference in the blackness of the black screen was significant between the two sheets, and it is known that the w external light reflection on the lenticular lens sheet of the invention was much reduced.

Next, three lenticular lens sheets were produced in the same manner as above, in which the external light-absorbing layer to be in each furrow was varied as in Table 3 below. The optical properties of those sheets and the image contrast through them were measured and evaluated.

TABLE 3

| Sheet No. | Width of External Light-Absorbing Layer, W (mm) | External Light-Absorbing Layer in Furrow adjacent to Ridge | | External Light-Absorbing Layer in Furrow adjacent to Lens | | Optical Properties | | |
|---|---|---|---|---|---|---|---|---|
| | | Height, $h_B$ (mm) | Ratio of $h_B$ to the height of ridge $H_B$, $h_B/H_B$ | Height, $h_L$ (mm) | Ratio of $h_L$ to the height of lens $H_L$, $h_L/H_L$ | Transmittance (%) | Image Discoloration | Image Contrast |
| 1 | 0.020 | 0.019 | 0.136 | 0.013 | 0.186 | 100.0 | no | 36.7 |
| 2 | 0.005 | 0.001 | 0.007 | 0.001 | 0.014 | 100.0 | no | 33.2 |
| 3 | 0.046 | 0.045 | 0.320 | 0.035 | 0.500 | 91.3 | yes, but a little | 40.5 |

From the data in Table 3, it is known that the image contrast through the lenticular lens sheet No. 2 where the ratio of the height $h_B$ of the external light-absorbing layer in each furrow adjacent to the ridge to the height $H_B$ of the ridge, $h_B/H_B$, is 0.007 is somewhat lower than that through the lenticular lens sheets Nos. 1 and 3 where that ratio, $h_B/H_B$, is larger than 0.01. It is also known therefrom that the transmittance through the lenticular lens sheet No. 3 where the ratio of the height $h_L$ of the external light-absorbing layer in each furrow adjacent to the lens to the height $H_L$ of the lens, $h_L/H_L$, is 0.5 is somewhat lower than that through the lenticular lens sheets Nos. 1 and 2 where that ratio, $h_L/H_L$, is smaller than 0.4. The image on the lenticular lens sheet No. 3 was discolored but a little, when seen obliquely.

As described in detail hereinabove, external light reflection on the lenticular lens sheet of the invention is much reduced, and the sheet gives high-contrast sharp images.

While the invention has been described in detail and with reference to specific embodiments thereof, it will be apparent to one skilled in the art that various changes and modifications can be made therein without departing from the spirit and scope thereof.

What is claimed is:

1. A lenticular lens sheet having a plurality of lenticular lenses formed on one surface of a light-transmissive substrate and having, on the other surface of the substrate, a plurality of convex lenses located at or near a focal position of each lenticular lens, and external light-absorbing ridges as formed alternately with those convex lenses and coated with an external light-absorbing layer on their tops, which is characterized in that every furrow between each convex lens and each external light-absorbing ridge that are adjacent to each other is further coated with an external light-absorbing layer, wherein the external light-absorbing layer provided within every furrow extends a predetermined height along a surface of a neighboring convex lens.

2. The lenticular lens sheet as claimed in claim 1, wherein the external light-absorbing layer to cover each external light-absorbing ridge is additionally around a part of each ridge adjacent to the top thereof.

3. The lenticular lens sheet as claimed in claim 1, wherein each furrow between the convex lens and the external light-absorbing ridge that are adjacent to each other has a nearly trapezoidal cross-sectional profile of which the flat base is nearly parallel to the sheet.

4. The lenticular lens sheet as claimed in claim 1, wherein each furrow between the convex lens and the external light-absorbing ridge that are adjacent to each other has a valley-like cross-sectional profile with no flat base parallel to the sheet.

5. The lenticular lens sheet as claimed in claim 1, wherein each furrow between the convex lens and the external light-absorbing ridge that are adjacent to each other has a nearly rectangular cross-sectional profile of which the flat base is nearly parallel to the sheet and the sides are nearly perpendicular to the sheet.

6. The lenticular lens sheet as claimed in claim 1, which satisfies a relation of $0.02 \leq h_L/H_L \leq 0.4$ where $h_L$ indicates the height of the external light-absorbing layer formed in each furrow adjacent to the neighboring lens and $H_L$ indicates the height of the lens.

7. The lenticular lens sheet as claimed in claim 1, which satisfies a relation of $0.01 \leq h_B/H_B \leq 0.3$ where $h_B$ indicates the height of the external light-absorbing layer formed in each furrow adjacent to the neighboring external light-absorbing ridge and $H_B$ indicates the height of the ridge.

8. The lenticular lens sheet as claimed in claim 1, which satisfies a relation of $0.02 \leq h_L/H_L \leq 0.4$ where $h_L$ indicates the height of the external light-absorbing layer formed in each furrow adjacent to the neighboring lens and $H_L$ indicates the height of the lens, and satisfies a relation of $0.01 \leq h_B/H_B \leq 0.3$ here $h_B$ indicates the height of the external light-absorbing layer formed in each furrow adjacent to the neighboring external light-absorbing ridge and $H_B$ indicates the height of the ridge.

9. A method for producing a lenticular lens sheet, which comprises applying an external light-absorbing material to a light-transmissive substrate having a plurality of lenticular lenses formed on one surface and having, on the other surface, a plurality of convex lenses located at or near a focal position of each lenticular lens, along with external light-absorbing ridges as formed alternately with those convex lenses so as to be coated with an external light-absorbing layer on their tops, thereby filling every furrow space between each convex lens and each external light-absorbing ridge that are adjacent to each other with the external light-absorbing material as applied thereto, then removing the excess external light-absorbing material existing in the area except every furrow between each convex lens and each external light-absorbing ridge that are adjacent to each other, thereby forming a layer of the external light-absorbing material only in that every furrow, and thereafter forming an additional external light-absorbing layer on each top of every external light-absorbing ridge.

10. The method for producing a lenticular lens sheet as claimed in claim 9, wherein the external light-absorbing layer is formed on the top of each ridge and partly around each ridge adjacent to the top thereof.

11. The method for producing a lenticular lens sheet as claimed in claim 9, wherein the external light-absorbing material is applied onto the entire surface of the light-transmissive substrate having thereon convex lens and external light-absorbing ridges, thereby filling every furrow between each lens and each ridge that are adjacent to each other, with said material.

12. A method for producing a lenticular lens sheet, which comprises applying an external light-absorbing material to a light-transmissive substrate having a plurality of lenticular lenses formed on one surface and having, on the other surface, a plurality of convex lenses located at or near a focal position of each lenticular lens, along with external light-absorbing ridges as formed alternately with those convex lenses, thereby forming a first external light-absorbing layer on each top of those external light-absorbing ridges, then applying a layer of an external light-absorbing material onto the entire surface of the substrate having thereon those external light-absorbing ridges, and thereafter removing the excess external light-absorbing material existing in the area except every furrow between each convex lens and each external light-absorbing ridge that are adjacent to each other, thereby forming a second external light-absorbing layer only in that every furrow.

13. The method for producing a lenticular lens sheet as claimed in claim 12, wherein the first external light-absorbing layer is formed on the top of each ridge and partly around each ridge adjacent to the top thereof.

14. A method for producing a lenticular lens sheet, which comprises applying an external light-absorbing material to a light-transmissive substrate having a plurality of lenticular lenses formed on one surface and having, on the other surface, a plurality of convex lenses located at or near a focal position of each lenticular lens, along with external light-absorbing ridges as formed alternately with those convex lenses, thereby forming a first external light-absorbing layer on each top of those external light-absorbing ridges, then filling every furrow space between each convex lens and each external light-absorbing ridge that are adjacent to each other with an external light-absorbing material as applied thereto, and thereafter removing the excess external light-absorbing material existing in the area except every furrow between each convex lens and each external light-absorbing ridge that are adjacent to each other, thereby forming a second external light-absorbing layer only in that every furrow.

15. The method for producing a lenticular lens sheet as claimed in claim 14, wherein the first external light-absorbing layer is formed on the top of each ridge and partly around each ridge adjacent to the top thereof.

* * * * *